United States Patent [19]

Pontier et al.

[11] Patent Number: 5,120,691
[45] Date of Patent: Jun. 9, 1992

[54] PROCESS FOR REGULATING OR CHECKING THE THERMAL LEVEL OF A PULVERULENT SOLID INCORPORATING A HEAT EXCHANGER WITH FLUIDIZED BED COMPARTMENTS

[75] Inventors: Renaud Pontier, Vienne; Frederic Hoffmann, Paris, both of France

[73] Assignee: Institut Francais du Petrole, Rueil-Malmaison, France

[21] Appl. No.: 539,510

[22] Filed: Jun. 18, 1990

[30] Foreign Application Priority Data

Jun. 16, 1989 [FR] France ................................ 89 08159

[51] Int. Cl.⁵ ...................... B01J 38/32; B01J 38/22; F28D 13/00; C10G 47/30
[52] U.S. Cl. ..................................... 502/44; 110/245; 110/347; 165/104.16; 165/104.18; 208/164; 422/144; 422/146; 422/198; 422/201; 502/43; 502/45; 502/47
[58] Field of Search ..................... 502/40–44, 502/45, 47; 208/164; 165/104.16, 104.18

[56] References Cited

U.S. PATENT DOCUMENTS

| | | | |
|---|---|---|---|
| 2,492,948 | 1/1950 | Berger | 502/44 |
| 4,249,472 | 2/1981 | Mitchell | 110/245 |
| 4,364,849 | 12/1982 | Vickers et al. | 502/44 |
| 4,430,302 | 2/1984 | Krause | 422/144 |
| 4,439,539 | 3/1984 | Lomas et al. | 165/104.16 |
| 4,578,366 | 3/1986 | Cetinkaya et al. | 502/6 |
| 4,965,232 | 10/1990 | Mauleon et al. | 502/44 |
| 4,971,767 | 11/1990 | Ludwigsen et al. | 165/104.16 |
| 4,989,669 | 2/1991 | Barnes | 502/44 |

Primary Examiner—Paul E. Konopka
Attorney, Agent, or Firm—Millen, White & Zelano

[57] ABSTRACT

A process and apparatus for the heat regulation of fluidized or fluid catalyst beds are described, the apparatus having a fluid bed heat exchanger. According to the invention, a pulverulent solid is made to flow essentially from the base of an enclosure (1) into a heat exchanger (6) having an internal separating partition (22) which defines two elongated, adjacent compartments (23, 24) communicating at their lower part. In the compartment in which the pulverulent solid flows downwards, the fluidization speed or rate is between 0.1 cm to 2 m/s, whereas in the compartment wherein the pulverulent solid rises again into the heat exchanger (6), the fluidization speed is between 0.1 and 6 m/s. The invention can be used for refining reaction (e.g., catalytic reforming), for the regeneration of a fluidized bed catalytic cracking catalyst of a petroleum or oil charge, or for the combustion of coal.

17 Claims, 1 Drawing Sheet

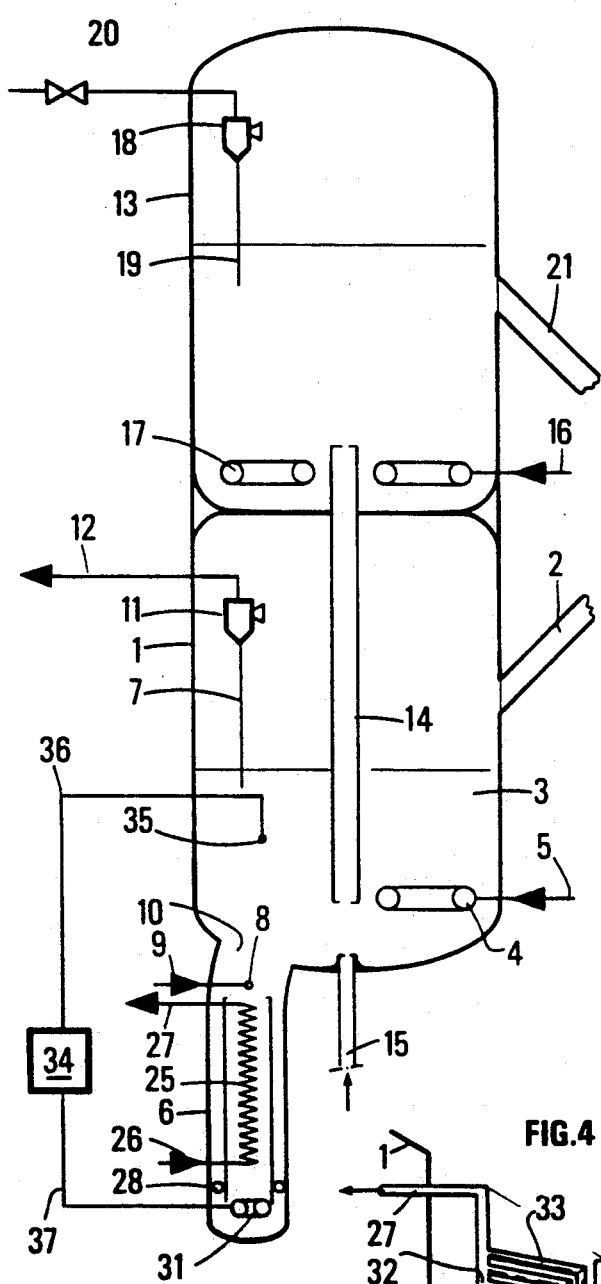
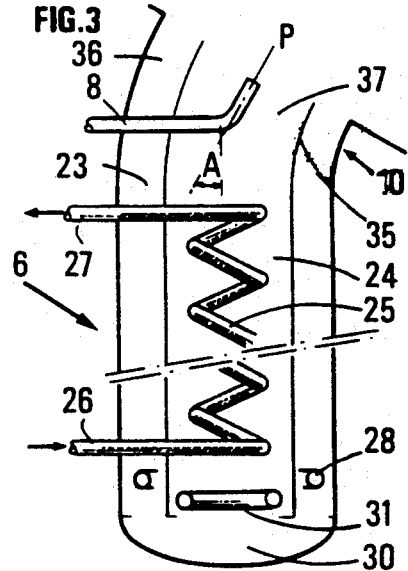
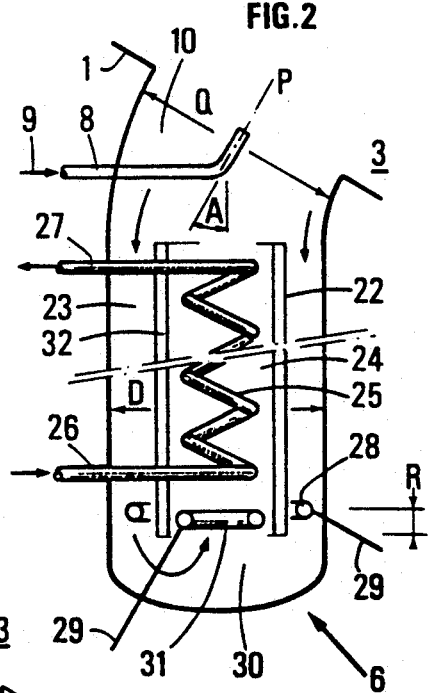
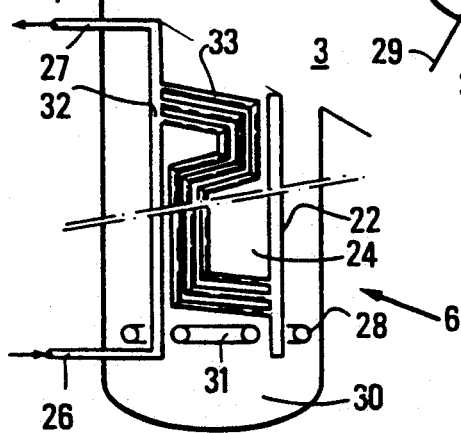

PROCESS FOR REGULATING OR CHECKING THE THERMAL LEVEL OF A PULVERULENT SOLID INCORPORATING A HEAT EXCHANGER WITH FLUIDIZED BED COMPARTMENTS

SUMMARY OF THE INVENTION

This invention relates to a process for regulating the heat and/or flow rate of a pulverulent solid with heat exchange in a fluidized bed and to an apparatus for performing this process. More particularly, the process can be used for regenerating catalysts, which are more especially charged with hydrocarbon residues and coke following reaction with a hydrocarbon charge. It can relate to hydrotreatment, hydrocracking, catalystic cracking, reforming or other contact catalysts, e.g., those used in thermal cracking processes. The invention can also relate to (a) any refining reaction in the presence of a fluidized catalyst or (b) the combustion of coal.

In a purely illustrative manner, it is possible to use the process and apparatus either for the combustion of coal or for catalyst fluidized bed refining reactions, or for the regeneration of a spent catalyst from a process, e.g., a fluidized bed catalytic cracking or reforming of heavy charges having a high Conradson carbon residue, such as an atmospheric residue, a vacuum residue, a deasphalted residue, etc., whereby said residues can be hydrotreated. Other applications are the drying of pulverulent solids in the temperature ranges which are imposed or specific, gasification also requiring imperative temperature conditions, various exothermic or endothermic chemical processes, the production of phosphoric acid and/or phosphates, ethylene oxidation, the preparation of alkyl chlorides, the preparation of phthalic anhydride and acrylonitrile, as well as Fisher and Tropsch synthesis. Reference is also made to steam cracking, fluidized bed furnaces, various combustion processes, the gasification of coal, heat recovering exchangers, various particle mixers, heat treatments to metal parts, the incineration of purification station sludge, various drying operations, clinker formation and/or calcination processes in the cement industry, zinc sulphide roasting in zinc production, etc. A particular use given in exemplified manner here is the regeneration of catalytic cracking catalysts.

In particular, in carrying out the cracking of charges constituted by hydrocarbons with a high boiling point, e.g., exceeding 550° C., or charges having a high Conradson carbon residue, or a high metal concentration, coke and heavy hydrocarbons can be deposited on the catalyst in large quantities and its regeneration by combustion can lead to the evolution of heat, which can lead to deterioration of equipment and deactivation of the catalyst.

With regard to the regeneration of catalysts (e.g., cracking), in order to obviate these disadvantages, U.S. Pat. No. 4,035,284 proposes carrying out regeneration in two zones, where combustion takes place wholly or partly under co-current conditions of the catalyst and the oxidizing fluid, so as to minimize the residence time of the catalyst at high temperature, but without exceeding 750° C., so as not to decrease the activity of the catalyst. U.S. Pat. No. 4,035,284 describes the recycling of part of the hot regenerated catalyst to the spent catalyst in the lower part of the regenerator in order to initiate combustion of the hydrocarbon deposits on the catalyst and conversion of the carbon monoxide. However, the regeneration temperature is limited to 750° C. due to the presence of steam resulting from the combustion of the coke and hydrogen of the hydrocarbons, which can be prejudicial to the stability of the catalyst, and as a result of the metallurgical limits of the generally used stainless steel.

In European patent 101,765 into a lower area of a regenerator is introduced a mixture of hot regenerated catalyst from a second upper zone and cold regenerated catalyst for controlling the combustion temperature of the catalyst in the regenerator. In order to cool the regenerated catalyst, it is introduced into a heat exchanger. This hot catalyst flows from bottom to top in the form of a dense fluidized bed within the exchanger.

As it is also necessary to bring this regenerated, cooled catalyst into the combustion zone of the regenerator, mix it with hot regenerated catalyst, spent catalyst and fluidization air in a mixing pipe downstream of the exchanger and upstream of the combustion zone, the need for fluidization at the outlet from the catalyst, the flow of the different phases is made extremely complicated. This leads to a disturbance at the exchanger outlet, so that the exchange surface is not used in the maximum possible way and the checking of the solids level in the exchanger becomes arbitrary.

Moreover, the erosion risk is increased. Finally, in the same way as the hot regenerated catalyst introduction, that of the cold catalyst and the spent catalyst take place in the lowest part of the regenerator in a dense phase, so that it is necessary to fluidize the grains of said catalysts contained in the regenerator in order to be able to carry out a dilute phase combustion and then supply it into the second regenerator zone.

The prior art is also illustrated by the following patents:

EP-A-0 239 609 describes a process, in which cooling takes place of a catalyst regenerated in a heat exchanger after sampling it by an intake pipe in a disengagement zone of the regenerator and reintroducing it into a combustion zone below the disengagement zone by an outlet pipe differing from the intake pipe into the exchanger. Moreover, the exchanger contains a single compartment where the catalyst flow is regulated.

FR-A-2 343 980 describes a heat reactor in which a catalyst-free chemical reaction takes place. It comprises at least one partition defining at least two compartments, at least one intake for the material to be treated on the reactor periphery, a discharge point for the treated material from the base of the central compartment and a gas outlet from the heat reactor. The partition and the bypass means above the compartment make it possible to define a flow of the material current in the form of a substantially horizontal cascade from the inner compartment to the peripheral compartment, said flow taking place around the partition and making it possible to carry out the chemical reaction under optimum conditions. However, this patent consequently does not describe a process for the heat regulation of a catalyst and its reintroduction into a reaction zone.

The prior art is best illustrated by U.S. Pat. Nos. 4,438,071; 4,483,276 and 4,439,533, where is is suggested that the regeneration temperature be checked or controlled by bypassing part of the catalyst into a heat exchanger, placed at the bottom of a disengagement zone located in the upper part of the regenerator and having an exchange bundle making it possible to cool said catalyst part to the requisite temperature level. The catalyst flow follows no clearly defined path in said exchanger. The catalyst heat exchange between the exchanger and the regenerator takes place solely as a function of the fluidization degrees of the two containers and the pressure levels in the disengagement zone. Therefore, the catalyst flow is erratic, in that it takes place sometimes in a preferred manner from the regenerator to the exchanger and sometimes in a preferred manner in the reverse direction.

In addition, the overall catalyst flow between the exchanger and the regenerator cannot be controlled, which means that this exchanger type only has one operating level, i.e., a greatly reduced flexibility.

The prior art is also illustrated by U.S. Pat. Nos. 2,492,948 and 4,690,802. In the first patent, part of the spent catalyst is introduced into a heat exchanger, whose intake is within a dense bed of a regenerator, and it is passed out at a higher level within the same dense bed. The cooled catalyst is raised by the rising force of a fluidization gas at the bottom of the exchanger. As stated in U.S. Pat. No. 4,438,071, this rising force involves very high gas velocities (several meters per second), which is prejudicial to the dense zone of the regenerator and make it difficult for the catalyst to enter the heat exchanger. Therefore, there is a limited heat exchange.

The present invention makes it possible to obviate the aforementioned disadvantages. In the particular use referred to hereinbefore, the present invention offers a simple process for controlling or checking the temperature of the catalyst in a regeneration zone and for maintaining said thermal level, e.g., in the catalytic cracking unit, at an acceptable threshold, even in the case where the hydrocarbon charge contains large amounts of carbon. In more general terms, the invention permits a heat regulation or a heat regularization and/or makes it possible to regulate or regularize the fluidized and/or fluid bed flow rates.

It is possible to remove excess calories or supply deficit calories and to ensure the thermal regularization of the fluid or fluidized beds in at least one treatment enclosure or zone. A pulverulent solid is introduced, the solid is treated in a dense or mobile fluidized bed zone, at least part of the solid is removed by a connecting member from the dense or mobile fluidized bed, said solid part is passed into an advantageously elongated, heat level checking or regulating zone, the heat level is checked or regulated by indirect heat exchange with a fluid and the thermally regulated solid part is reintroduced into the dense or mobile fluidized bed of the treatment zone by the connecting member. More specifically, in a mobile or dense fluidized bed said part of the solid is made to flow in the regulating zone having an internal separating partition, which defines two adjacent compartments, elongated in accordance with their axis of symmetry and communicating by their lower portion, the solid preferably flowing downwards, in the fluidized or mobile state in one of the compartments, the fluidization speed in said compartment advantageously being between 0.1 cm/s and 2 m/s and the catalyst rising in the fluidized state into the other compartment, the fluidization speed in said other compartment advantageously being between 0.1 and 6 m/s.

Preferably, the fluidization speed in the rising compartment is higher than the speed in the falling compartment.

The remainder of the description applies to the regeneration of a catalytic cracking catalyst. The organized flow from one compartment to the other, with a passage into the lower part of the regulating zone and in this case a cooling, makes it possible to check the cooled catalyst flow rate between the treatment (here regeneration) zone and the cooling zone (or heat exchanger) by an adequate adjustment of the fluidization speeds in each compartment of the cooling zone. In a preferred manner, the fluidization speed in the compartment in which the catalyst falls is between 0.1 cm/s and 1 m/s and that in the other compartment in which the cooled catalyst rises for leading to the base of the dense fluidized bed of the regenerator is between 0.3 and 5 m/s. Under these conditions, the catalyst enters the heat exchanger more easily, there is a substantial absence of disturbance in the dense bed of the regenerator and there is an excellent heat exchanger level.

According to a feature of the process, the cooling zone has an internal separating partition between the two adjacent, elongated compartments, which communicate by their lower part. This partition can be a planar surface, which can bear substantially along the axis of the exchanger on the generally cylindrical wall of the latter, e.g., in accordance with one of its generatrixes, or an envelope coaxial to said axis. In a preferred manner, said partition can have a circular or rectangular section along a plane perpendicular to the exchanger axis, substantially coaxial to the exchanger cylinder and having a height less than that of the exchanger, so as to permit a link between the thus defined concentric compartments.

Advantageously, the compartment where the catalyst rises towards the regenerator has heat exchange means described hereinafter. In the case of coaxial compartments, it is preferably the central compartment which contains the heat exchange means and by which the catalyst rises again. The heat exchange is then better, because the speed of the catalyst ensured by the fluidization gas, normally air, is higher.

In order to avoid any erosion problem, the distance R along the heat exchanger axis between the lower part of the partition and the means for injecting a fluidization gas into each of the compartments is generally between 0 and 0.8 m and advantageously between 0.4 and 0.6 m. Preferably, these injection means are positioned within the compartments. As a general rule, the upper part of the partition does not project beyond the upper level of the exchanger, so that it does not significantly protrude into the dense bed of the regenerator.

The spent catalyst can be regenerated in two separate regenerating zones. According to a first embodiment, a first regeneration of the catalyst from a reaction zone takes place in a first regenerating zone, the at least partly regenerated catalyst is cooled according to the above process and the cooled catalyst from the first zone is passed into a second regenerating zone, where a second regeneration is carried out. The regenerated catalyst separated from the combustion effluents is generally recycled from the second regenerating zone to the reaction zone.

According to a second embodiment, a first regeneration of the catalyst from the reaction zone takes place in a first regenerating zone, the at least partly regenerated catalyst is passed to a second regenerating zone and a second regeneration is carried out. The catalyst is cooled according to the aforementioned process and recycling takes place of the regenerated catalyst separated from the combustion effluents from the second regenerating zone to the reaction zone.

The first regeneration effluents can either be separated in the first regenerating zone, or can be supplied with the catalyst to the second regenerating zone, where they are then separated.

All these means combined together help to bring about a better heat exchange compared with the prior art in an apparatus having a reduced cost and a more simple use.

The heat exchanger can be of a per se known type. It can comprise a vertically oriented calendar in which the catalyst can, e.g., flow externally of the cooling tubes, whilst the cooling fluid, generally water, flows within said tubes.

According to another embodiment, the heat exchanger can have a plurality of sinuous tubes arranged along its axis of symmetry. The term sinuous defines a sinusoidal, indented, zig-zag, accordion or similar configuration.

According to another embodiment, the exchanger can be of another type. The partition defining the exchanger compartments can represent part of the exchange surface. This surface is in the form of diaphragm tubes. A plurality of tubes in which the cooling fluid flows and which extends along the longitudinal axis of the exchanger is connected by longitudinally welded fins in such a way as to form a pressure-tight, continuous surface. As the exchange surface is not generally adequate to ensure the integrality of the requisite heat exchange, the interior of the compartment where catalyst cooling takes place can be filled with a plurality of exchange tubes arranged in the manner described hereinbefore. This solution offers the advantage of increasing the exchange surface for a given heat exchanger volume, particularly when the partition surrounds the heat exchange means.

The invention also relates to an apparatus for the treatment and heat regulation of a pulverulent solid (e.g., for the fluidized bed, continuous regeneration of a spent catalyst).

It comprises in combination:
a) a treatment (e.g., regenerating) unit (1), which is substantially vertical and whose lower part has a mobile or dense fluidized bed (3) of said pulverulent solid,
b) a preferably cylindrical, elongated heat exchanger (6), which is advantageously positioned in a substantially vertical manner, which has an axis of symmetry and which can optionally have in its upper part a solid inlet and outlet communicating with said mobile or dense bed,
c) heat exchange means (25) contained in said heat exchanger, connected to inlet (26) and outlet (27) pipes for a heat regulating fluid, said apparatus being characterized in that the exchanger comprises in combination:
an internal separating partition (22) defining two elongated, adjacent compartments (23, 24) along said axis of symmetry, a first compartment having an upper end connected to said solid intake into the compartment and optionally a lower end out of which passes the solid, a second compartment having a lower end by which optionally enters the solid from the first compartment and an upper end connected to said possible solid outlet,
a passage space (30) adapted to the passage of the solid from the first compartment to the second compartment,
means (28) for the injection of a fluidization gas into the first compartment and located in the vicinity of the lower end of the first compartment and adapted to optionally bring about a flow of solid in downward manner in the fluidized or optionally mobile state and
second means (31) for injecting a fluidizing gas into the second compartment, positioned in the vicinity of the lower end of the second compartment and adapted to bring about a flow of solid in a rising manner in the fluidized or mobile state, whereby said injection can be purely vertical or can lead to a helical rising flow having a desired pitch and speed, and optionally a diffuser generally in the lower part of the exchanger for a generally gaseous fluid in order to ensure the fluidization of the solid.

According to another feature of the apparatus, the latter can have means for checking the flow rate of the fluidizing gas connected to said injection means and controlled by means dependent on a temperature measuring means in the treatment (e.g., regenerating) unit. When the apparatus has two treatment (e.g., regenerating) units, the temperature measuring means can either be in the first unit or in the second.

According to another feature of the apparatus according to the invention, it can comprise a linking member between the regenerating unit and the heat exchanger, with an axis of symmetry P oriented in accordance with an angle A with respect to the axis of symmetry of the exchanger which is in general between 0° and 80°, advantageously between 40° and 50° and of diameter Q between 0.8 and 1.5 times, preferably between 0.9 and 1.2 times the diameter D of the exchanger (external envelope). It can comprise at least one aerating member by a gas, such as air, which is located in the vicinity of the axis P of the linking member and appropriate for producing a jet velocity linked with the section of the aerating member between 50 and 150 m/s and preferably between 80 and 120 m/s.

According to another embodiment of the process, the linking member can have an internal partition, which defines two chambers, whereof one communicates with the first compartment of the exchanger and whereof the other communicates with the second compartment. It also has an aerating means substantially located along the axis P of the linking member and preferably in the vicinity of axis P, in the chamber communicating with the compartment in which the raising of the solid takes place.

BRIEF DESCRIPTION OF THE DRAWINGS

The following drawings diagrammatically illustrate the performance of a regenerating process used in a fluidized bed catalytic cracking unit with double regeneration of the catalyst, the second regenerating unit being positioned above the first and in accordance with the same vertical axis.

FIG. 1 shows an apparatus, in which the catalyst regenerated in a first regenerator flows to a heat exchanger before being regenerated in a second regenerator.

FIG. 2 shows in longitudinal section the heat exchanger with a linking member communicating with the first regenerator and a preferred exchange bundle.

FIG. 3 shows in longitudinal section the heat exchanger incorporating the linking member having a partition defining two coaxial chambers.

FIG. 4 in longitudinal section shows the heat exchanger with a bundle of tubes.

DETAILED DESCRIPTION

The apparatus according to FIG. 1 essentially comprises a first regenerator 1 for a spent catalyst, such as a zeolite, coming from a separating unit of a fluidized bed catalytic cracker not shown in the drawing. This cokecharged, spent catalyst arrives by a line 2 in the dense fluidized bed 3 of a first regenerator. This bed is realized by a fluidization ring 4 of a gas, e.g. air, supplied by a line 5.

According to FIG. 1, the catalyst which is at least partly regenerated, preferably in counter-current manner by air, drops by gravity to a heat exchanger 6, whose intake and outlet are connected to the base of the first regenerator 1 via a linking member 10 ensuring the passage of the catalyst before and after cooling. The catalyst is aerated in the linking member 10 by air supplied by a line 9 and using the aerating means 8.

Once the catalyst has been cooled by the process of the invention, it flows in the opposite direction to that previously and rises in the dense fluidized bed of the first regenerator by the same linking member 10. The particles of the catalyst are entrained by the combustion gas and are separated by internal cyclones 11, which are advantageously located in the upper part of the first regenerating unit. The combustion gas, which is rich in hydrogen sulphide, carbon monoxide and water, is evacuated by a pressurized line 12 for a subsequent treatment, whilst the catalyst particles drop by leg 7 to the bottom of the first regenerator 1. They are then transferred to the second regenerating unit by pipe 14 supplied with air by line 15. The bottom of the second regenerating unit is also supplied with air by line 16 and injector 17. The combustion of the remaining coke takes place in counter-current with the injected air.

The combustion gases discharged in the upper part of the second regenerator 13 are treated in an internal or external cyclone 18, at the bottom of which the catalyst particles are returned by the pipe 19 to the second regenerator 13, while the combustion gases are discharged by the line 20, where a safety valve is provided.

The regenerated catalytic particles at the desired optimum temperature are recycled at a controlled flow rate by a recycling pipe 21 to the cracking unit riser supply means and which is not shown in the drawing.

Although it is possible to entrain the heat at any random point of the cracking unit, it is advantageously carried out at one of the regenerators and it is preferable, particularly for practical reasons, to position the heat exchanger 6 at the first regenerator 1.

At least part of the at least partly regenerated catalyst is removed from the dense bed 3 and drops in accordance with FIG. 2 into the heat exchanger. The latter, which is elongated and, e.g., cylindrical, comprises an internal separating partition 22 forming a cylinder which is substantially coaxial to the exchanger containing it. This partition defines two adjacent, elongated compartments 23, 24, whereof one is annular and the other, central and cylindrical, so that said two compartments have a common wall, i.e., the aforementioned partition.

The surface of the central compartment defined by a plane substantially perpendicular to the exchanger axis and which is advantageously circular is generally between 0.2 and 0.7 times the circular surface of the exchanger corresponding to its outer envelope and defined by the same plane.

This central compartment contains heat exchange means 25, which have an appropriate shape and are surrounded by the partition 22. Their lower part is, e.g., supplied by cooling water or any other fluid, oil, etc., supplied by a line 26 and the upper part or outlet of said means 25 discharges a two-phase mixture of water and steam corresponding to the exchange by a line 27.

The two compartments are linked by their lower part. Thus, the separating partition defines a passage space 30 for the catalyst, because said partition does not reach the bottom end of the exchanger. The position of the partition is determined by the distance R from its lower end to fluidization or injection means 28 and 31 for a gas such as air, which is supplied by a line 29 and located in the vicinity of the lower part of the compartments and preferably within each of the compartments. This distance is advantageously between 0.4 and 0.6 m.

The catalyst flows from top to bottom in the peripheral compartment in fluidized bed form. It is moved by the first fluidizing means 28 (a ring or a grid), which provides said peripheral compartment with a fluidizing speed or rate, e.g., between 1 cm/s and 10 cm/s. It then passes through the passage space 30 at the bottom of the exchanger and rises in the fluidized bed central compartment. Second fluidizing means 31 (ring or grid) are suitable for supplying the central compartment, which generally has a larger volume, a fluidizing speed or rate, e.g., between 0.1 and 1 m/s. The fluidization pressure is generally higher in the rising part than in the falling part and it is possible to adjust the heat flow by acting on a pressure differential between the two compartments.

The internal separating partition surrounding the exchange means can be constituted by a plurality of diaphragm tubes 32 forming the envelope of the central compartment and through which the cooling fluid flows. These tubes extend in a manner substantially parallel to the longitudinal axis of the exchanger and are connected by longitudinally welded fins so as to constitute the said envelope.

The heat exchange means 25 within the central compartment can be a bundle of tubes 33 regularly distributed about the exchanger axis. In a preferred manner and as shown in FIG. 4, the bundle is constituted by a plurality of tubes 33 having a sinuous, indented, nonright angled form, defining layers which are imbricated in one another and arranged substantially in accordance with the exchanger axis. The distance between the layer is generally between 4 and 7 times the tube diameter.

In general terms, the upper part of the separating partition does not significantly project beyond the extension of the lower wall of the regenerator on which is inserted the exchanger (FIG. 4).

In the case where the exchanger is advantageously provided with a linking member 10 (FIG. 2) ensuring the communication of the catalyst between the actual exchanger and the regenerator, the partition generally reaches the upper level of the cylindrical part (FIG. 2) of the exchanger.

The linking member 10 of axis of symmetry P is generally oriented in accordance with an angle A with respect to the axis of symmetry of the exchanger between 0° and 80°, preferably between 40° and 50° and its external diameter Q is normally between 0.8 and 1.5 times the external diameter D of the exchanger and is preferably between 0.9 and 1.2 times. FIG. 4 illustrates the case where the angle A is zero. Within the linking member 10, there are aerating means 9 advantageously in the vicinity of the axis of symmetry P and which direct the aerating air towards the regenerator at a jet velocity linked with the section of the aerating means between 50 and 150 m/s and advantageously between 80 and 120 m/s.

FIG. 3 shows another embodiment of the apparatus, which here comprises a linking member 10 between the regenerating unit 1 and the heat exchanger 6, which has an axis of symmetry P oriented in accordance with an angle A with respect to the axis of symmetry of the exchanger between 0° and 80°. Said member 10 has a partition 35 with a circular section, which is disposed substantially along the axis P of the linking member and which defines two substantially coaxial chambers 36 and 37, whereof one 36 is annular and communicates with the compartment 23, where the catalyst falls and whereof the other 37 communicates with the central compartment 24 where the catalyst rises. In addition, the chamber 37 in which the exchange tubes 33 are distributed comprises at least one catalyst aerating member 8, which is in the vicinity of the axis P of the linking member.

The apparatus according to the invention comprises a means 34 for controlling or checking the fluidization gas flow rate connected to injecting means 28, 31 for said gas and advantageously to the injecting means 31 in the central compartment, where the catalyst rises. Said checking means 34 is dependent on a measuring means 35 of the temperature of the catalyst in the first regenerator 1, or optionally in the second regenerator 13, by means of connecting lines 36 and 37.

The flow rate of the catalyst circulating in the heat exchanger is adjusted by acting on the fluidization speed in the compartment where an upward flow takes place, in order to maintain the temperature of the first or second regenerators at a satisfactory level and therefore to maintain the temperature of the regenerated catalyst to be recycled to the intake of the reaction zone riser at a reference or set temperature dependent on the charge to be cracked.

When the regenerator temperature is above the set temperature, the checking or control means supplies a signal to the fluidizing air injection means 31, so as to increase the flow rate in the central cooling compartment. However, when the regeneration temperature is below the set temperature, the control means 34 emits a signal, which acts on the air injection means 31 and makes it possible to reduce the fluidization speed in the central compartment or stops the exchange. The following table 1 illustrates the heat exchange level as a function of the fluidization speed in the central catalyst rise compartment.

| Fluidization speed (m/s) | Max exchange % |
|---|---|
| 1 | 100 |
| 0.6 | 100 |
| 0.3 | 50 |
| 0.1 | 20 |
| 0 | 0 |

Tests have revealed that by working at a fluidization rate in the regenerating zone of 0.6 m/s, a fluidization rate in the falling part of the exchanger of 0.15 m/s and a fluidization rate in the rising part of the exchanger of 1 m/s, a gain of 35% is obtained on the maximum exchange value.

The description has related to the case where the central compartment was cylindrical. However, the invention would still apply if the central compartment had a rectangular section. The invention would also still apply with a planar partition defining two elongated, adjacent compartments.

We claim:

1. A process for regulating the thermal level in a continuous moving or fluidized bed catalyst regeneration treatment of pulverulent catalyst solids, comprising:

introducing pulverulent catalyst solids into at least one catalyst regeneration treatment zone wherein said catalyst solids are treated in a moving bed or dense fluidized bed;

removing at least a part of said catalyst solids from said catalyst regeneration treatment zone by means of a linking member, said linking member providing fluid communication between said at least one catalyst regeneration treatment zone and a regulating zone, said linking member having a first end and a second end whereby said linking member is in fluid communication with said catalyst treatment zone by said first end and is in fluid communication with said regulating zone by said second end, said linking member being provided with aerating means which directs air toward said at least one catalyst regeneration treatment zone at a jet velocity of 50–150 m/s;

passing said part of said catalyst solids into said regulating zone via said linking member, said regulating zone being elongated and having a longitudinal axis;

performing heat regulation within said regulating zone by indirect heat exchange between said part of said catalyst solids and a fluid;

reintroducing the resultant thermally regulated part of said catalyst solids into said moving bed or dense fluidized bed of said catalyst regeneration treatment zone by said linking member;

wherein said part of said catalyst solids is removed from said catalyst regeneration treatment zone and reintroduced into said catalyst regeneration treatment via said first end;

wherein said regulating zone contains an internal separating partition, which defines two adjacent compartments elongated in accordance with said axis, said two adjacent compartments communicating at their lower portion; and wherein said part of said catalyst solids is made to flow into said regulating zone by means of a moving bed or dense fluidized bed, said part of said catalyst solids flowing downward in a fluidized state in one of said two compartments and flowing upward in a fluidized state in the other of said two compartments.

2. A process according to claim 1, wherein the fluidization speed in said compartment through which catalyst solids flow downwards is 0.1 cm/s–2 m/s and the fluidization speed in said other compartment is 0.1–6 m/s.

3. A process according to claim 1, wherein said solids are spent catalyst which are regenerated by combustion of coke deposited on the catalyst during a hydrocarbon conversion reaction in a reaction zone, said catalyst is regenerated in said at least one treatment zone into which catalyst is introduced from said reaction zone, the catalyst is regenerated in a dense fluidized bed in the presence of a gas containing oxygen under regenerating conditions, and wherein the fluidization speed in said compartment through which catalyst solids flow downwards is 0.1 cm/s-2 m/s and the fluidization speed in said other compartment is 0.1-6 m/s.

4. A process according to claim 1, wherein the fluidization speed in said compartment through which catalyst solids flow downwards is 0.1 cm/s-1 m/s and the fluidization speed in said other compartment is 0.3-5 m/s.

5. A process according to claim 1, wherein said separating partition defines two coaxial compartments.

6. A process according to claim 1, wherein there are two of said treamtment zones and said treatment zones are spent catalyst regenerating zones, wherein a first regeneration of catalyst takes place in a first regenerating zone and at least partly regenerated catalyst is supplied from said first regenerating zone to a second regenerating zone where a second regeneration occurs.

7. A process according to claim 1, wherein the fluidization gas employed in said regulating zone is an inert gas.

8. A process according to claim 6, wherein said part of said catalyst solids passing into said regulating zone is removed from said first regenerating zone via said linking member.

9. A process according to claim 1, wherein the fluidization speed in said compartment through which catalyst solids flow downward is higher than the fluidization speed in said other compartment.

10. A process according to claim 1, wherein the distance along the longitudinal axis of said regulating zone between the lower end of said partition and means for injecting fluidization gas into each of said compartments is 0-0.8 m.

11. A process according to claim 1, wherein the distance along the longitudinal axis of said regulating zone between the lower end of said partition and means for injecting fluidization gas into each of said compartments is 0.4-0.6 m.

12. A process according to claim 5, wherein said two coaxial compartments are a peripheral and a central compartment and wherein the cross sectional area of said central compartment is 0.2-0.7 times the cross sectional area of said regulating zone.

13. A process according to claim 5, wherein said two coaxial compartments are a peripheral and a central compartment and wherein the fluidization speed in said peripheral compartment is 1-10 cm/s, and the fluidization speed in said central compartment is 0.1-1 m/s.

14. A process according to claim 1, wherein said linking member has a longitudinal axis which makes an angle of 0°-80° with respect to the axis of symmetry of said regulating zone.

15. A process according to claim 1, wherein said linking member has a longitudinal axis which makes an angle of 40°-50° with respect to the axis of symmetry of said regulating zone.

16. A process according to claim 1, wherein the diameter of said linking member is 0.8-1.5 times the diameter of said regulating zone.

17. A process according to claim 1, wherein the internal separating partition extends into the linking member.

* * * * *